United States Patent
Iwasaki (10) Patent No.: US 9,681,007 B2
(45) Date of Patent: Jun. 13, 2017

(54) PROCESSING RECEIVED IMAGE DATA BASED ON A COMMUNICATION STATUS OF AN IMAGE FORMING APPARATUS THAT RECEIVES THE IMAGE DATA

(71) Applicant: Oki Data Corporation, Tokyo (JP)

(72) Inventor: Tsutomu Iwasaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/837,679

(22) Filed: Aug. 27, 2015

(65) Prior Publication Data
US 2016/0156789 A1 Jun. 2, 2016

(30) Foreign Application Priority Data
Nov. 27, 2014 (JP) ................ 2014-240392

(51) Int. Cl.
*G06F 3/12* (2006.01)
*H04N 1/00* (2006.01)
*H04N 1/21* (2006.01)

(52) U.S. Cl.
CPC ...... *H04N 1/00103* (2013.01); *G06F 3/121* (2013.01); *G06F 3/1211* (2013.01); *G06F 3/1236* (2013.01); *G06F 3/1244* (2013.01); *G06F 3/1285* (2013.01); *H04N 1/00204* (2013.01); *H04N 1/2104* (2013.01); *H04N 2201/0039* (2013.01); *H04N 2201/0055* (2013.01); *H04N 2201/0094* (2013.01)

(58) Field of Classification Search
CPC  H04N 1/00103; H04N 1/2104; G06F 3/1285; G06F 3/1211; G06F 3/121; G06F 3/1244; G06F 3/1236

USPC ........................................... 358/1.15
See application file for complete search history.

(56) References Cited

U.S. PATENT DOCUMENTS

| | | | |
|---|---|---|---|
| 8,508,760 B2 * | 8/2013 | Sahashi ............ | G06F 21/608 358/1.14 |
| 2006/0072151 A1 * | 4/2006 | Amani ............. | G06F 3/1203 358/1.15 |
| 2013/0024382 A1 * | 1/2013 | Dala et al. ........ | G06F 19/322 705/51 |
| 2013/0042162 A1 * | 2/2013 | Muthu ............. | H03M 13/09 714/755 |
| 2013/0325326 A1 * | 12/2013 | Blumenberg ..... | G01C 21/32 701/428 |

FOREIGN PATENT DOCUMENTS

JP      2006-027215 A      2/2006

* cited by examiner

*Primary Examiner* — Eric A Rust
(74) *Attorney, Agent, or Firm* — Muncy, Geissler, Olds & Lowe, P.C.

(57) ABSTRACT

An image forming apparatus that is connected to a network includes a communication part that communicates image forming data, which is to be printed on a medium, through the network, a communication status obtaining part that obtains a communication status of the communication part, a determination part that determines, based on the communication status of the communication part, which of a first process or a second process is executed on the image forming data received by the communication part, the determined process being defined as the data process, a receipt data processing part that processes the image forming data in either the first process or the second process that is determined by the determination part.

18 Claims, 6 Drawing Sheets

| Radio Wave Strength Specified Value T | −70dBm |

PROCESSING RECEIVED IMAGE DATA BASED ON A COMMUNICATION STATUS OF AN IMAGE FORMING APPARATUS THAT RECEIVES THE IMAGE DATA

CROSS REFERENCE

The present application is related to, claims priority from and incorporates by reference Japanese Patent Application No. 2014-240392, filed on Nov. 27, 2014.

TECHNICAL FIELD

The present invention relates to an image forming apparatus applicable to, for example, a multi function printer (MFP) that has a printer function that receives print data via network and prints it.

BACKGROUND

Conventionally, as a printer that receives print data via network, there has been an art described in Patent literature 1.

Patent literature 1 describes a re-sending process of a printer that receives print data via wireless LAN, and the re-sending process processes re-printing when printing is suspended due to deterioration in radio wave condition.

[Patent Literature 1] Japanese Unexamined Patent Application Publication No. 2006-27215

However, conventionally, MFPs having a printer function that receives print data via wireless LAN have had an issue that occupancy time by print job is long when a communication condition is remarkably deteriorated while receiving print data because other processes (such as other printing jobs, fax communication printing, and making photocopies) that require printing cannot be processed until communication of print data is completed and printing ends.

Therefore, an image forming apparatus that can perform efficient image forming (printing) when it receives image forming data (for example, print data of print job) via network and forms an image is desired.

SUMMARY

An image forming apparatus, which is disclosed in the application, that is connected to a network includes a communication part that communicates image forming data, which is to be printed on a medium, through the network, a communication status obtaining part that obtains a communication status of the communication part, a determination part that determines, based on the communication status of the communication part, which of a first process or a second process is executed on the image forming data received by the communication part, the determined process being defined as the data process, a receipt data processing part that processes the image forming data in either the first process or the second process that is determined by the determination part.

According to the present invention, it is possible to provide an image forming apparatus that performs efficient image forming when it receives image forming data via network and forms an image.

DESCRIPTION OF EMBODIMENTS

(A) First Embodiment

Hereinafter, an embodiment of an image forming apparatus according to the present invention is explained in detail as referring to the drawings.

(A-1) Configuration of First Embodiment

Figure 1:
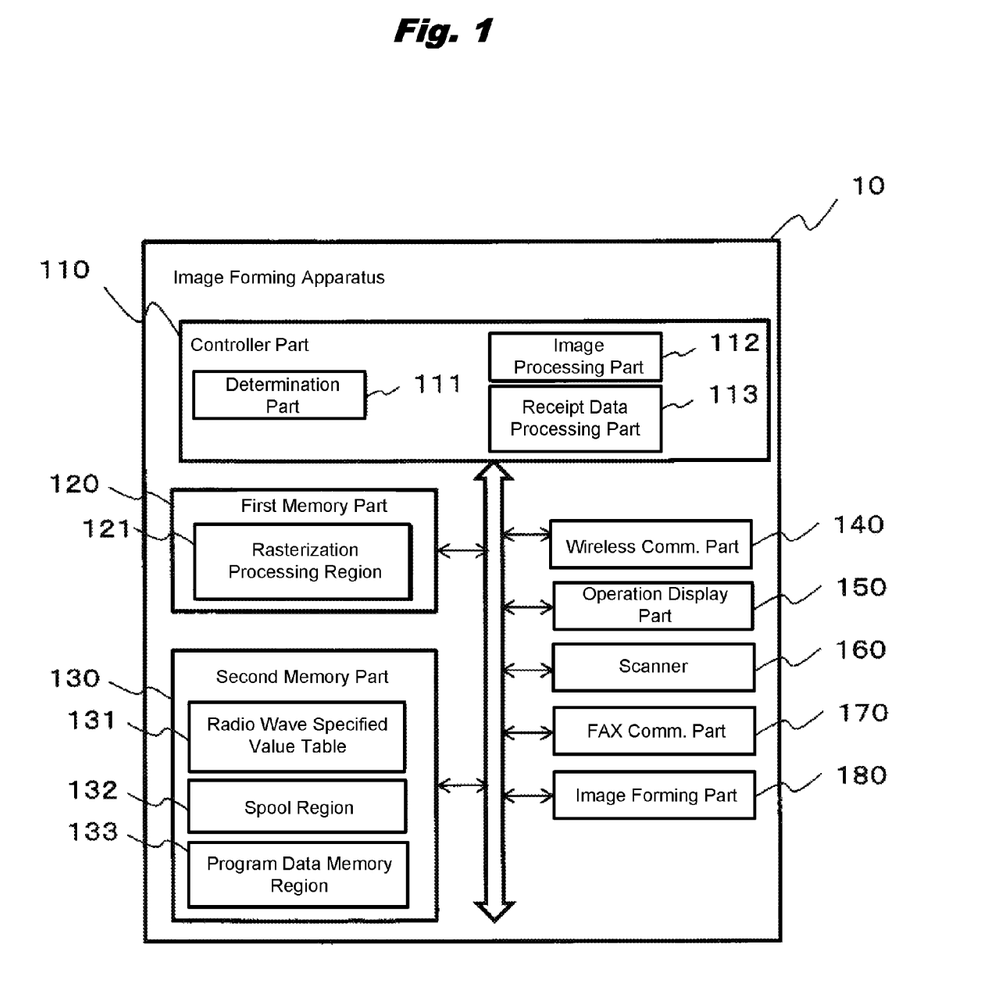
FIG. 1 is a block diagram that shows a functional configuration of an image forming apparatus of an embodiment.
Figure 2:
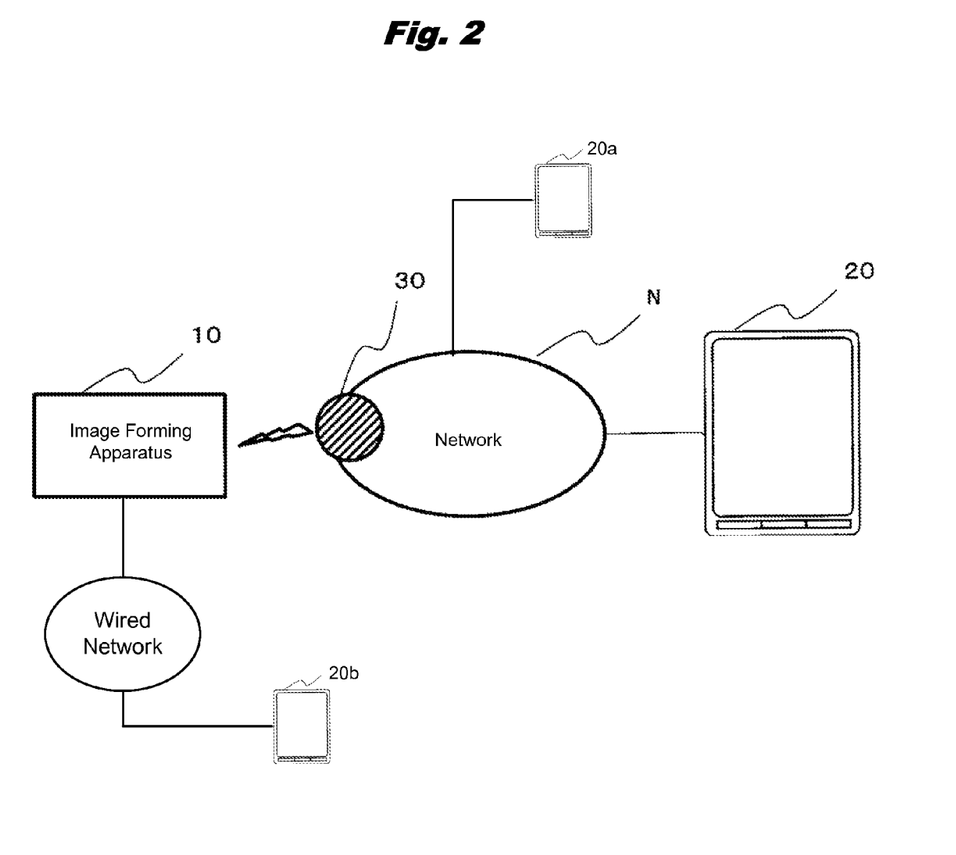
FIG. 2 is a block diagram that shows a connection configuration of peripherals of the image forming apparatus of the embodiment. User Devices 20 and 20a are wirelessly connected to the image forming apparatus 10. User Device 20b is connected to the apparatus 10 with a line.

FIG. 2 is a block diagram that shows a connection configuration of an image forming apparatus 10 of the present embodiment. FIG. 1 is a block diagram that shows a functional configuration of the image forming apparatus 10 of the embodiment.

The image forming apparatus 10 is an apparatus that functions as a MFP. The image forming apparatus 10 is a MFP that functions as at least printer, facsimile, copier, and scanner.

In the embodiment, the image forming apparatus 10 is connected to network N by a wireless LAN interface. An information processing apparatus 20 is a client (user terminal) that supplies print data of print job, and is connected via the network N. The information processing apparatus 20 is provided with a print driver (not shown) for example. The print data of print job is generated and transmitted by the print driver. The image forming apparatus 10 performs a process to print something on a print sheet (medium) based on the print data of print job received from the information processing apparatus 20. Format of the print data is not limited, however, data described in various description formats such as page description language (PDL) is applicable. The user terminal is not limited to be single. Other terminals (20a, 20b) as well can be used for the invention.

The image forming apparatus 10 is connected to the network N via a wireless access point 30 on the network N. In other words, the image forming apparatus 10 performs a direct wireless connection (connection using a wireless LAN interface) to the wireless access point 30 on the network N.

Next, an internal configuration of the image forming apparatus 10 is explained.

The image forming apparatus 10 includes a controller part 110, a first memory part 120, a second memory part 130, a wireless communication part 140 as a communication part 140, an operation display part 150, a scanner 160, a fax communication part 170, and image forming part 180.

The controller part 110 has a function that controls the configuration elements of the image forming apparatus 10, and is configured with a processor etc., for example.

The first memory part 120 and the second memory part 130 have a function of a memory unit that memorize data in the image forming apparatus 10. In this embodiment, the first memory part 120 is configured with a volatile memory (such as DRAM, SRAM, etc.) and the second memory part 130 is configured with a nonvolatile memory (such as HDD, flash memory, EEPROM, etc.). Note, a configuration of the memory unit in the image forming apparatus 10 is not limited to the above-described configuration, and various configurations may be applied. For example, in the image forming apparatus 10, the memory unit may be configured only with nonvolatile memories.

As described above, in the image forming apparatus 10 of the embodiment, a computer for performing data processing, various control processing, and the like is configured with the controller part 110 as a processor and the first and second memory parts 120 and 130 as memory units. Details of a control processing performed by the computer is explained later.

The wireless communication part 140 is a communication interface (wireless LAN interface) for connection to the network N. A communication specification to be applied to the wireless communication part 140 is not limited. However, for example, a wireless LAN interface (for example, a wireless LAN interface compatible to IEEE 802.11 series) compatible to Wi-Fi (trademark) is applicable. Also, a setting of the wireless communication part 140 is not limited, however, herein the wireless communication part 140 is set to be connected (linked) to the network N via a wireless access point 30.

The operation display part 150 functions as a user interface (direct user interface.) The operation display part 150 has a function for information output to a user and a function for receipt of input of operations from a user. The operation display part 150 may be configured with, for example, a combination of a liquid crystal display and hard keys, a touch panel display, and the like.

The scanner 160 scans manuscript (manuscript document) and generates image data (scanned data). The scanner 160 executes scanning of manuscripts for fax communication, manuscripts for photocopying, and the like.

The facsimile communication part 170 transmits image signals (fax signals) based on the supplied image data to a destination via a telephone line (not shown) (for example, public telephone line). The facsimile communication part 170 transmits image signals (fax signals) based on the image data read by the scanner 160, for example.

The image forming part 180 prints (forms an image of) an image based on the supplied image data (rasterized image data) onto print sheet (medium). A printing method (image forming method) of the image forming part 180 is not limited, however, explanation is given as it is assumed that a printing method of electrophotographic type is applied to the image forming part 180 of the embodiment. Specifically, the image forming part 180 develops a toner image (developer image) based on the rasterized image data, and performs a fusing process. Regarding a specific configuration of printing process of the image forming part 180, configurations (processes) the same as or similar to various electrophotographic printers (for example, various LED printers, laser printers, etc.) may be applied so description of detail process thereof is omitted.

Next, a detail configuration (functional configuration) is given of the above described computer in the image forming apparatus 10 (the computer provided with the controller part 110, the first memory part 120, and the second memory part 130.)

According to the embodiment, in the first memory part 120, a rasterization processing region 121 is secured as a work region for performing a process of rasterization and the like based on print data. Also, in the present embodiment, in the second memory part 130, a spool region 132 for spooling received print data and a program data memory region 133 for memorizing a program executed by the controller part 110 are secured. Furthermore, in the present embodiment, in the second memory part 130, a radio wave strength specified value table 131 is memorized for using the table for a controlling process that will be mentioned later.

Once activated, the controller part 110 reads a predetermined program data from the program data memory region of the second memory part 130 and execute it. In the embodiment, the controller part 110 reads program data corresponding to at least the determination part 111, the image processing part 112, and the receipt data processing part 113 illustrated in FIG. 1, and executes it. In other words, by executing the above-described predetermined program, the controller 110 functions as the determination part 111, the image processing part 112, and the receipt data processing part 113. At this moment, the controller 110 may use the first memory part 120 and the second memory part 130 as work regions (work memories) for executing the program. Also, in the embodiment, it is explained that the determination part 111, the image processing part 112, and the receipt data processing part 113 have software-based configuration. However, the process may be partially or entirely configured to have a hardware-based configuration (for example, configured with a chip and a circuit, which are specified for this configuration.)

Next, a detail description is given about functions (programs) that configure the controller part 110.

The image processing part 112 generates image data (image data to be printed by the image forming part 180) that is made by rasterizing print data received by the receipt data processing part 113 for each print page (print image). Then, as the rasterized image data for one page is generated, the image processing part 112 supplies the image data to the image forming part 180 and causes the image forming part 180 to print it. The image processing part 112 executes, based on a determination result by the determination part 111, a process of performing rasterization on the print data received by the wireless communication part 140 step by step even in the middle of receiving the print data, supplying the image data on which rasterization is completed to the image processing part 112, and starting the print process (for example, a process of performing a one page printing every time a receipt of print data for one page is completed, and hereinafter the process is referred to as "print data step-by-step process" or simply step-by-step process), or a process of performing a rasterization process only one time on print data that has been received by the wireless communication part 140 (print data whose all pages of print data has been received) and causing the image processing part 112 to start print process (hereinafter, referred to as "print data one-time process" or simply one-time process)

Figure 6A:
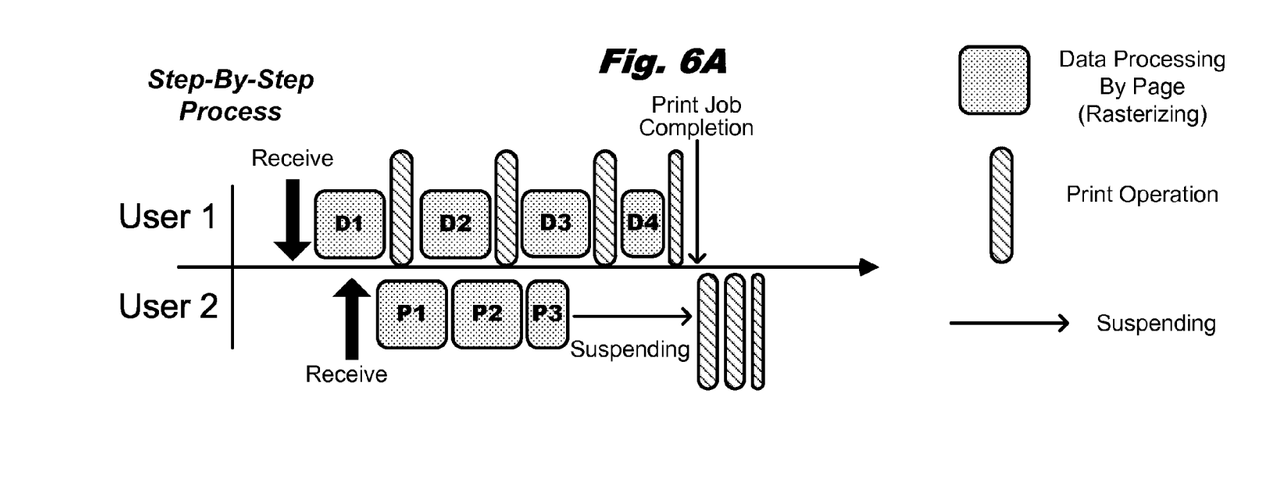
FIGS. 6A and 6B illustrate schematic time tables of one-time process and step-by-step process.
Figure 6B:
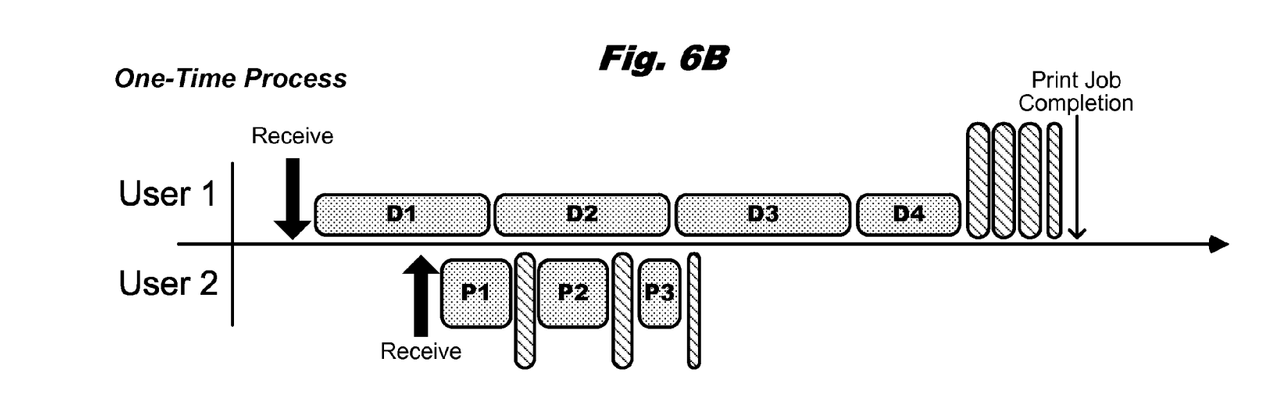

The step-by-step process is illustrated in FIG. 6A. The one-time process is in FIG. 6B. In the both figures, User 1 is connected to the image forming apparatus 10 using device 20a through a wireless network and User 2 is connected to the apparatus 10 using device 20b through a wired network. Therefore, the communication status between the apparatus 10 and device 20a varies depending on traffic of the wireless network. On the other hand, the communication status between the apparatus 10 and device 20b is always preferable. FIG. 6A assumes that the communication status with User 1 is preferable. FIG. 6B assumes that the communication status with User 1 is un-preferable.

FIG. 6A shows that the image processing part receives print data from the device 20a of User 1 prior to the device 20b of User 2, initiating to process the print job for User 1 first and print job for User 2 next. Because the communication status with User 1 is preferable, the step-by-step process is executed for User 1. Specifically, when first data processing D1 is done, the print operation follows soon. Second data processing D2, third data processing D3, fourth data processing D4 are respectively followed by corresponding print operations.

The image processing part includes more than two processors so that multiple data process(es) run at the same time. Specifically, data processing for User 1 and data processing for User 2 run in parallel (simultaneously) in the image processing part 112. It is also noted that, in the step-by-step process, the control part 110 handles print job in a receiving order. When the control part receives the first print job prior to the second print job, the second print job cannot be completed until the first print job is done. Specifically, the print operation for the second print job needs to be suspended until the print operation for the first print job is done. Accordingly, while the above data processing for print data D1 to D4 and print operations for User 1 are executed, the image processing part only performs the data processing for print data P1 to P3 for User 2 but suspends the print operations corresponding to the print data D1 to D4. After all of the print operations for User 1 are completed, the print operation for Use 2 begins.

Each unit of processed data (or rasterized data) is shown with a hatched box. Regarding User 1, the first three boxes (D1 to D3) are square, indicating that the data amount meet a full of one page. The last box (D4) of the data is shorter than others, indicating that the data amount does not meet a full of one page. That is because a small reminder usually remains after dividing the print data by a single page amount unit. The shorter box means a data amount that is less than one page.

FIG. 6B shows the one-time process where the communication status for User 1 is poor (un-preferable). Due to the poor status, the data processing for print data D1 to D4 takes longer time, the data amount that is processed per second becomes smaller than that is in the preferable communication status. Thereby, the boxes of data (D1 to D4) are shaped thinner and wider than what in FIG. 6A. For User 1, even when completing to rasterize the first print data D1, the controller does not perform the print operation, instead continues to rasterize the print data D2 to D4. After all of the data processing are done, the corresponding print operations begin. When the one-time process is performed, the controller does not suspend a print operation for User 2 until a print operation for User 1 is completed. Because the communication status for User 2 is preferable, the controller executes the step-by-step process for User 2 while the data processing for print data D1 to D4 run. Accordingly, each time when data processing P1 to P3 is done, the print operations begin soon after the process so that User 2 obtains the prints soon even the print for User 1 takes a longer period.

As described above, in the image forming apparatus 10, an image forming processing part that performs the rasterization process on print data (image forming data) received by the image processing part 112 and the image forming part 180 and performs image forming (printing on print sheet.)

The receipt data processing part 113 processes print data received via the wire communication part 140 based on the determination made by the determination part 111. The receipt data processing part 113 stores print data in the middle of being received by the wireless communication part 140 in the rasterization processing region 121 in the first memory part 120 when the determination part 111 determines the print data step-by-step process to be executed. Also, the receipt data processing part 113 stores (spools) print data in the middle of being received by the wireless communication part 140 in the spool region 132 in the second memory part 130 when the determination part 111 determines the print data one-time process to be executed.

The determination part 111 recognizes whether a communication states has a predetermined or higher quality (preferable communication status) or lower (un-preferable communication status) based on a communication status at the moment when the wireless communication part 140 receives print data. In the embodiment, the determination part 111 recognizes that the communication status has a predetermined or higher quality (preferable communication status) when receiving strength of radio wave of wireless radio wave at the wireless communication part 140 (receiving strength of radio wave received from a wireless access point 30) is a threshold or higher, and the determination part 11 recognized that the communication status has a quality lower than the predetermined quality (un-preferable communication status) when the receiving strength is smaller than the threshold.

Then, when the determination part 111 determines that the communication status has the predetermined or higher quality (preferable communication status), it determines the print data step-by-step process to be executed. When the determination part 111 determines that the communication status has the quality lower than the predetermined quality (un-preferable communication status), it determines the print data one-time process to be executed. Then, as described above, the image processing part 112 and receipt data processing part 113 perform the process based on the determination result by the determination part 111.

In this embodiment, an explanation is given as it is possible in the wireless communication part 140 to measure the receiving strength for each communication source of data. Wireless communication part 140 serves as a communication status obtaining part that obtains a communication status. Specifically, an explanation is given as it is possible in the wireless communication part 140 to measure the receiving strength of radio wave for each communication source of packet (Ethernet (trademark) frame) (for each MAC address of the communication source). Regarding a configuration of the wireless communication part 140 for measuring the receiving strength of radio wave, a configuration similar to the ones of various wireless LAN interfaces is applicable, so a detail description is omitted.

In the embodiment, the determination part 111 applies a value in the radio wave strength specified value table 131 memorized in the second memory part 130 to the threshold for recognizing the communication status.

Figure 3:
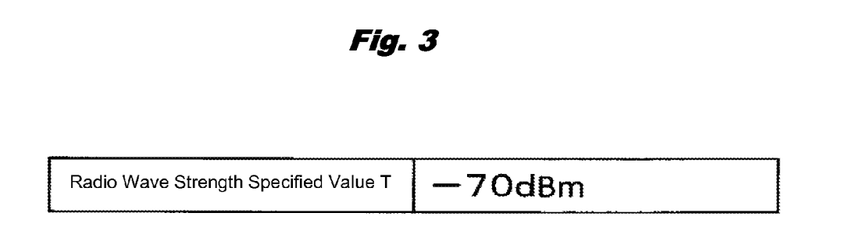
FIG. 3 is an explanatory view that shows a configuration example of radio wave strength specified value table of the embodiment.

FIG. 3 is an explanatory view that shows a configuration example of radio wave strength specified value table of the embodiment.

As illustrated in FIG. 3, a radio wave strength specified value T is memorized in the radio wave strength specified value table 131 in the embodiment. The radio wave strength specified value T illustrated in FIG. 3 is "−70 dBm." Note, in the embodiment, a unit of the radio wave strength specified value T is not limited to "dBm" as long as receiving strength is represented.

(A-2) Performance of Embodiment

Next, a performance of the image forming apparatus 10 of the embodiment including such above-described configuration is explained.

Figure 4:
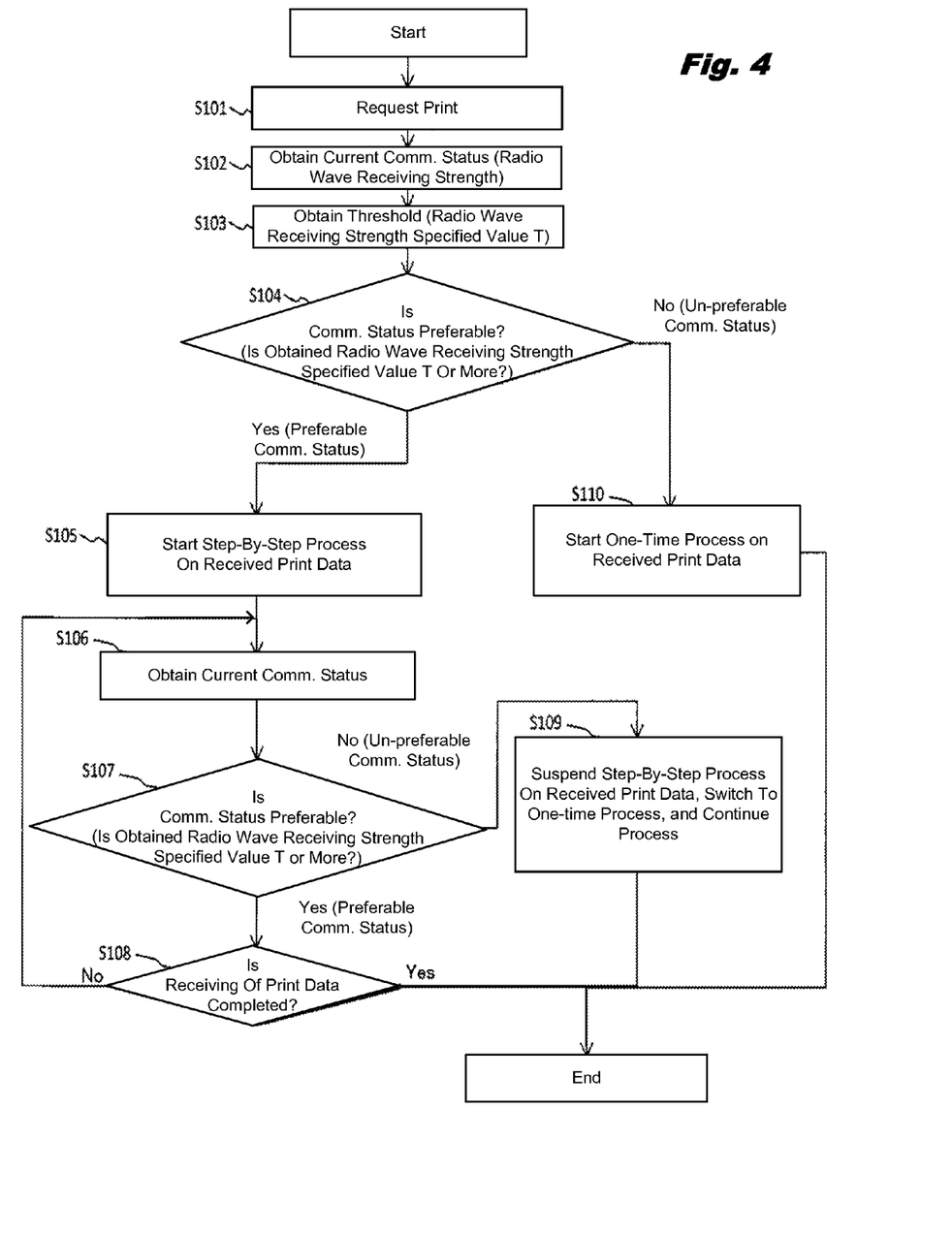
FIG. 4 is a flow diagram that shows an example of performance of the image forming apparatus according to the embodiment.

FIG. 4 is a flow diagram that shows a performance that the controller part 110 of the image forming apparatus 1 receives print data and performs print process.

First, a print request (request to receive print data of print job) is given from the information processing apparatus 20 to the image forming apparatus 10 (S101). The print request is received by the receipt data processing part 113. Then, the receipt data processing part 113 communicates to the information processing apparatus, and a sequence to start print data receipt is executed.

Once the receipt data processing part 113 starts the print data receipt, the determination part 111 obtains a current communication status (radio wave receiving strength value) from the wireless communication part 140 (S102).

Then, the determination part 111 reads and obtains the radio wave strength specified value T ("−70 dBm" in the embodiment) as the threshold from the radio wave strength specified value table 131 in the second memory part 130 (S103). Note, the determination part 111 may read the radio wave strength specified value T in advance.

Next, the determination part 111 recognizes the communication status based on a comparison result of the radio wave receiving strength value obtained from the wireless communication part 140 and the radio wave strength specified value T (S104). Specifically, when the radio wave receiving strength value read from the wireless communication part 140 is the same as the radio wave strength specified value T or higher than that (when the radio wave receiving strength is −70 dBm or higher), the determination part 111 recognizes that the current communication status is preferable. When the radio wave receiving strength is less than −70 dBm, the current communication status is recognized un-preferable.

When the current communication status is recognized preferable, the determination part 111 determines the print data step-by-step process to be executed. In this case, the controller part 110 performs from S105, which will be described later. On the other hand, when the current communication status is recognized un-preferable, the determination part 111 determines the print data one-time process to be executed. In this case, the controller part 110 performs from S110, which will be described later.

In the above-described step S104, when it is determined that the current communication status is preferable and the print data step-by-step process is to be executed, the receipt data processing part 113 stores the received print data in the rasterization processing region 121. Then, for each time that print data of one page is stored in the rasterization processing region 121, the image processing part 112 performs the rasterization process on print data of the one page, and causes the image forming part 180 to execute the print process (S105).

On the other hand, in the above-described Step S104, when it is determined that the current communication status is un-preferable and the print data one-time process is to be executed, the receipt data processing part 113 spools (stores) the print data of all pages in the spool region 132 in the second memory part 130. Then, in the spool region 132 of the second memory part 130, when spooling of print data of all pages is completed (receiving of print data is completed), the image processing part 112 executes the rasterization process on the spooled print data (print data is developed in the rasterization processing region 121 and processed), and causes the image forming part 180 to executes the print process (S110).

When the print data step-by-step process is started by the image processing part 112 and the print data receiving process part 113 in the above-described Step S105, the determination part 111 performs a process for monitoring the communication status until the receiving of the print data that has been started in S101 is completed (S106-108). Then, when the communication status changes to the un-preferable status while being monitored (when the communication status is determined un-preferable in S107), the determination part 111 suspends the print data step-by-step process and switches to the print data one-time process. Then, the receipt data processing part 113 and the image processing part 112 perform the print data one-time process on the print data received from the information processing device 20 (S109).

Figure 7:
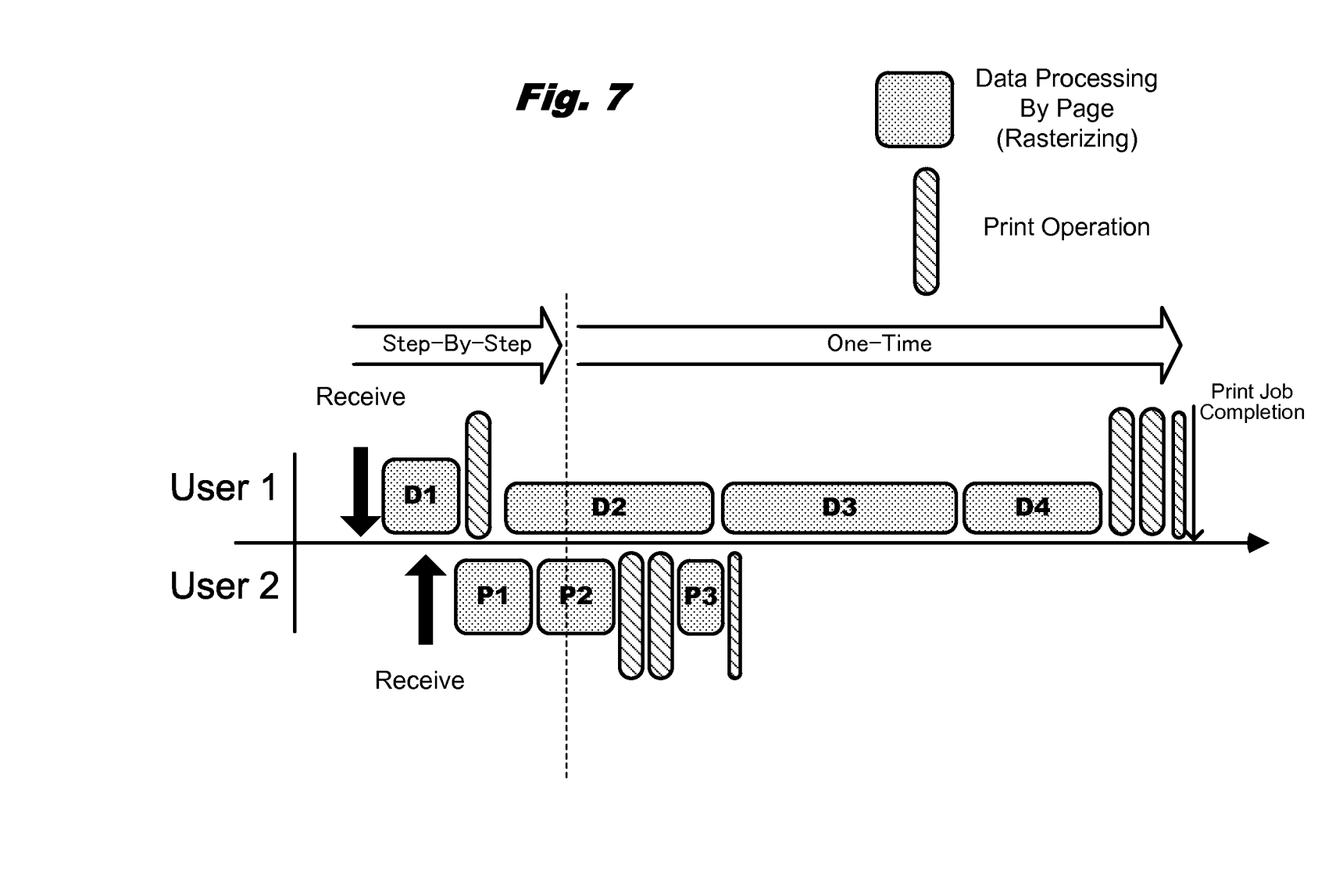
FIG. 7 illustrate another time table in which the data process is switched from step-by-step process to one-time process.

The status determination and the process switch are illustrated in FIG. 7. In the drawing, the communication status for User 1 is assumed to be a preferable first, then to be turned to un-preferable. The communication status for User 2 is stably preferable to the end. When receiving print data from User 1, the determination part 111 determines that the status for User 1 is "preferable." The image processing part performs the step-by-step process for the first page print data D1 due to the preferable status. Following the process for print data D1, the controller performs a print operation corresponding to the print data D1. Then, the processing for print data D2 is performed after the print operation for D1. While processing the print data D2, the determination part 111 determines that the communication status became un-preferable, switching the process from the step-by-step process to the one-time process. Thereby, those print operations for print data D2 to D4 are suspended until all of the processing D2 to D4 are done.

During the process for User 1, other print data delivered from User 2 is received. While the step-by-step process runs for User 1, the controller handles only data processing for User 2. In FIG. 7, data processing for print data P1 is performed. At the end of the process, User 1 is still in the step-by-step process, the print operation for print data P1 does not run soon. Instead, another data processing for print data P2 is performed. As shown in the drawing, in the middle of data processing for print data P2, the process for User 1 is switched to the one-time process that is because the communication status is detected as un-preferable. After processing print data P2, the controller executes print operations for print data P1 and P2 continuously, then performs another data processing for print data P3. The process for User 2 is switched according to User 1's communication status. Under the current invention's idea, it is practical to switch the process from the one-time process to the step-by-step process.

Specifically, the receipt data processing part 113 spools entirely the remains of print data (print data received hereinafter) in the spool region 132 of the second memory part 130. Then, when the spooling of print data of all pages to the spool region 132 in the second memory part 130 is completed (when receiving of print data is completed), the image processing part 112 executes the rasterization process on the spooled print data (develops the print data in the rasterization processing region 121), and causes the image forming part 180 to execute the print process. Note, when the switch to the print data one-time process is executed in the process in S109, the controller part 110, until the completion of the receiving (spooling) of the print data, performs a release of occupation of the image processing part 112 (release of resources), and makes print process related to other functions (for example, copier function and facsimile function) to an executable status.

(A-3) Effects of Embodiment

According to the embodiment, effects as described below can be obtained.

In the image forming apparatus 10 of the embodiment, when the communication status is un-preferable (when the radio wave receiving strength is lower than the specified value T) at the time of receiving print data, the print data one-time process (process of starting printing after the spooling of all of the print data is completed), and when the communication status is preferable (when the radio wave receiving strength is the specified value T or higher), the print data step-by-step process (process of printing at a certain timing even in the middle of receiving print data). As the result, in the image forming apparatus 10, when the communication status is un-preferable, in order to prevent the long-time occupation of the image forming part 180, the print data one-time process is executed, and when the communication status is preferable, the print data step-by-step process is performed to start the print process at an early moment. As described above, in the image forming apparatus 10, the print process can be efficiently executed by switching the print data step-by-step process and the print data one-time process depending on the communication status.

(B) Other Embodiments

The present invention is not limited to the above-described embodiment. Other modified embodiment exemplified below can be shown.

(B-1) Parameters for Communication Status

In the above-described embodiment, the determination part 111 recognizes whether the communication status is preferable or not based on the receiving strength of radio wave received by the wireless communication part 140 (at wireless access point 30). However, another parameter can be used to recognize the communication status (obtain data of the communication status). For example, the image forming apparatus 10 (determination part 111) may recognize whether the communication status is preferable or not based on an error rate at the time of receiving print data (error rate of packet received from the wireless access point 30) and data transfer speed (communication speed or throughput).

(B-2) Wired Network

In the above-described embodiment, the image forming apparatus 10 is connected to the network N via wireless communication, however, wired connection (for example, connection using a wired LAN interface) may be used. In the case, the image forming apparatus 10 may be connected to a layer 2 switch, a router (layer 3 switch) and the like (not illustrated) on the network N, for example, using a Ethernet cable. Also, in this case, the image forming apparatus 10 may recognize whether the communication status is preferable or not based on, for example, an error rate (error rate of packet received from a switch directly connected by an Ethernet cable), a data communication speed, and the like.

Also, when the image forming apparatus 10 is connected to the network N using a wire LAN interface, whether the communication is preferable or not is recognized as considering, for example, a connection speed of LAN (for example, a type of LAN interface determined by Auto-Negotiation.) For example, a case is assumed that the image forming apparatus 10 has a wire LAN interface that is connectable by either one of 10base-t, 100base-tx, and 1000base-t (it is possible to determine a media by Auto-Negotiation). In this case, the determination part 111 determines that the communication status is preferable when being connected by 100Base-Tx or 1000Base-T and determines that the communication status is un-preferable when being connected by 10Base-T.

(B-3) Plural Nodes

In the above-described embodiment, the wireless communication part 140 is connected to only one wireless access point 30. However, a network configuration that is able to communicate to plural wireless nodes (for example, a configuration of multi-hop wireless network) is also applicable. In this case, the determination part 111 may determine whether the communication status is preferable or not based on a communication status (for example receiving strength of radio wave) with a wireless node through which print data goes at the time of receiving print data from the directly communicatable wireless nodes.

(B-4) Using Communication History

Figure 5:
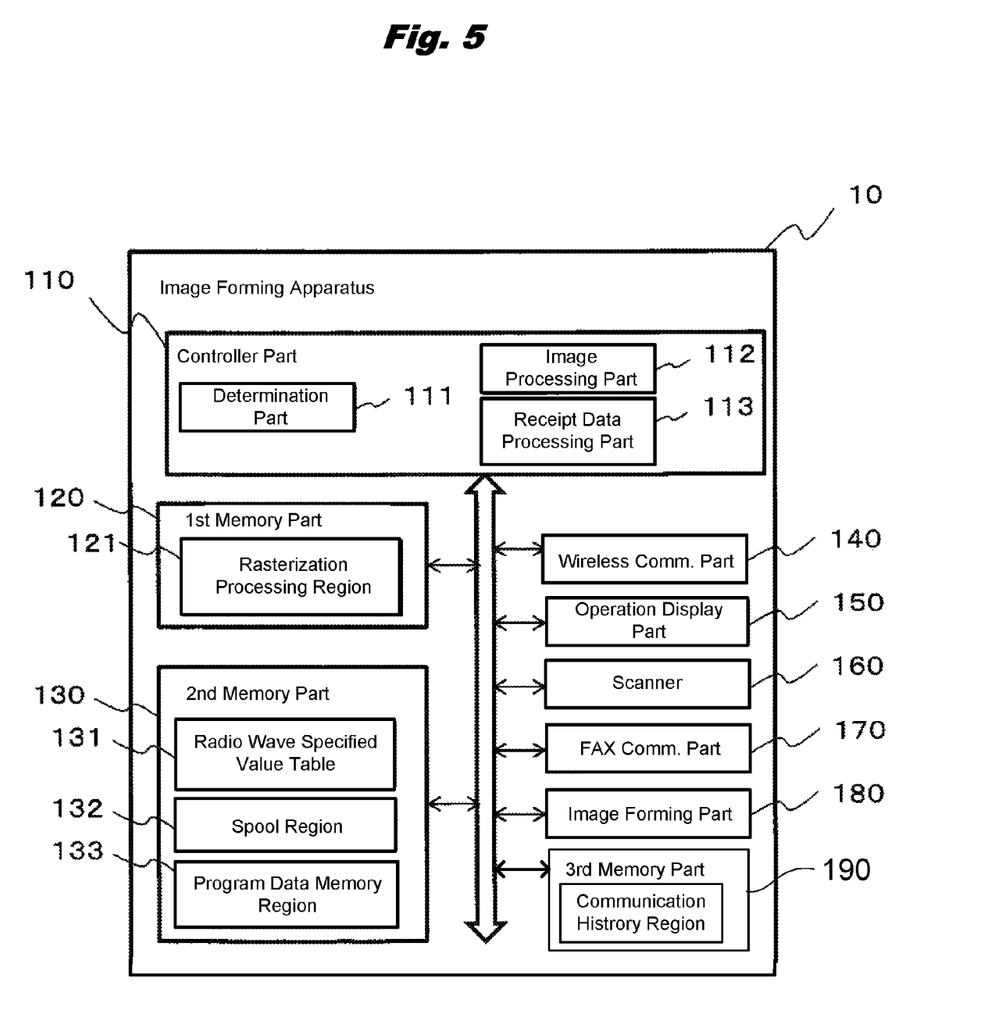
FIG. 5 is a block diagram that shows a functional configuration of an image forming apparatus of another embodiment.

In the above-described embodiment, the determination part 111 determines which the print data step-by-step process or the print data one-time process is to be executed based on the current communication status, however, it may be determined based on a history of past communication status. For example, a history of communication status (for example, past radio wave receiving strength and data communication speed at the time of receiving print data) is stored for each identifier related to a user ID or a user terminal (information processing apparatus 20), and at a next time when print data is printed using the same identifier, it is possible to determine which the print data step-by-step process or the print data one-time process is to be executed based on the stored history of communication status. FIG. 5 illustrates a functional structure executing the above embodiment which uses the histories of communications. The difference from FIG. 1 is that 3rd memory part 190, which has a communication history region inside, is added. These above communication histories are to be stored in that region. Not to mention, these communication history may be stored in 2nd memory part. For example, the controller part 110 may hold a data communication speed (for example, an average bit rate after beginning of receiving the print data until completion of the receiving) at the time of receiving print data in the past for each terminal (for example, MAC address, IP address, and host name of communication source). Then, the determination part 111 recognizes that a communication status related to a terminal is un-preferable at a time of receiving print data from the terminal when a value of past data communication speed related to the terminal is lower than a thresholds, and the determination part 111 recognizes the communication related to the terminal preferable when the past data communication speed is the thresholds or higher. As described above, the controller 110 can perform a second or subsequent determination process at a higher speed when print data is received and is printed with the same terminal more than once.

(B-5) Omission of S106-S109

In the above-described embodiment as illustrated in S106-109 in FIG. 4, it is explained that the determination part 111 keeps monitoring the communication status even after the determination part determines the print data step-by-step process to be executed, and it is switched to the print data one-time process when the communication status changes to the un-preferable status. However, these processes (processes of S106-109 after it is determined to have the print data step-by-step process) may be omitted. In other words, the determination part 111 may have a configuration that doesn't perform the process of switching to the print data one-time process.

(B-6) Devices Other Than Printer

In the embodiment, it is explained that the image forming apparatus of the present invention is a MFP that has functions of a scanner, facsimile, copier, and printer. However, the combination is not limited other than printer in the image forming apparatus of the present invention.

What is claimed is:

1. An image forming apparatus that is connected to a network, comprising:
   a communication part that receives image forming data, which is to be printed on a medium, through the network;
   a communication status obtaining part that obtains a communication status of the communication part;
   a determination part that determines, based on the communication status of the communication part, which of a first process or a second process is executed on the image forming data received by the communication part, the determined process being defined as a data process,
   a receipt data processing part that processes the image forming data in either the first process or the second process that is determined by the determination part,
   an image processing part that generates image data to be printed on the medium from the image forming data that are processed by the receipt data processing part, and
   an image forming part that forms an image on the medium using the image data, wherein
   the first process is a one-time process and the second process is a step-by-step process,
      the one-time process being defined in which the image processing part starts generating the image data after the receipt data processing part processes all of the image forming data, and
      the step-by-step process being defined in which the image processing part starts generating the image data while the communication part receives the image forming data.

2. The image forming apparatus according to claim 1, wherein
   the image forming data is print data that is segmented by page, which is a unit size data amount designated for a single page print, so that the print data is composed with multiple page print data including from a first page print data to a last page print data,
   in the one-time process, the image processing part starts generating the image data after the last page print data is generated by the image processing part, and
   in the step-by-step process, the image processing part starts generating the image data after the first page print data is generated by the image processing part and before the last page print data is generated by the image processing part.

3. The image forming apparatus according to claim 1, wherein
   the image forming data is print data that is segmented by page, which is a unit size data amount designated for a single page print, so that the print data is composed with multiple page print data including from a first page print data to a last page print data, and
   the determination part determines either the first process or the second process when the page print data is delivered to the communication part.

4. The image forming apparatus according to claim 1, wherein
   the image forming data is print data that is segmented by page, which is a unit size data amount designated for a single page print, so that the print data is composed with multiple page print data including from a first page print data to a last page print data, and
   the determination part determines either the first process or the second process whenever the page print data is delivered to the communication part.

5. The image forming apparatus according to claim 1, wherein
   during the step-by-step process, the determination part performs the determination with a predetermined interval, and
   when the communication status is recognized as changed, the determination part switches the data process from the one-time process to the step-by-step process.

6. The image forming apparatus according to claim 1, wherein
   when the determination part determines that the one-time process is to be executed after the determination part determined that the step-by-step process was to be executed previously, the receipt data processing part switches a location to store the received image forming data from a first memory part to a second memory part.

7. The image forming apparatus according to claim 1, further comprising:
   a first memory part that includes a processing region where the image processing part generates the image data,
   a second memory part that stores the image forming data for the one-time process, wherein
   the receipt data processing part
      saves the received image forming data in the second memory part when the determination part determines the one-time process to be executed, and
      saves the received image forming data in the first memory part when the determination part determined the step-by-step process to be executed.

8. The image forming apparatus according to claim 7, further comprising:
   a control part that controls the image processing part, the first memory part, and the second memory part, wherein
   during the one-time process, the control part releases the processing region that has been used by the image processing part,
   the control part causes the image processing part to process other image forming data in association with either a copier command or a facsimile command while receiving the image forming data for the one-time process.

9. The image forming apparatus according to claim 7, further comprising:
   a third memory that stores a history of the communication status, the history being composed with previously obtained communication status,
   the determination part determines the data process based on the history of the communication status.

10. The image forming apparatus according to claim 9, wherein
   the image forming apparatus is connected at least two information processing apparatuses via the network, those two information processing apparatuses being defined as outer devices,
   the third memory that stores the history of the communication status associated with an identification code for each of the outer devices, the determination part determines the data process based on the history of the communication status.

11. The image forming apparatus according to claim 1, wherein
   the determination part determines the step-by-step process to be executed when the communication status of the communication part is preferable, and determines the one-time process to be executed when the communication status of the communication part is un-preferable.

12. The image forming apparatus according to claim 11, wherein
   the communication part is connected to the network with a cable.

13. The image forming apparatus according to claim 11, wherein
   the communication part is wirelessly connected to the network.

14. The image forming apparatus according to claim 13, wherein
   the determination part recognizes whether the communication status of the communication part is preferable or not based on a receiving strength of radio wave which is wirelessly received by the communication part from the another communication device on the network.

15. The image forming apparatus according to claim 14, wherein
   the determination part recognizes whether the communication status of the communication part is preferable or not depending on a comparison result of the receiving strength of radio wave and a predetermined threshold.

16. The image forming apparatus according to claim 15, wherein
   the determination part recognizes that the communication status of the communication part is preferable when an error rate at the time when receiving the image forming data is less than a predetermined threshold.

17. The image forming apparatus according to claim 15, wherein
   the determination part recognizes that the communication status of the communication part is preferable when a data transfer speed is greater than a predetermined threshold.

18. The image forming apparatus according to claim 15, wherein
   the determination part recognizes that the communication status of the communication part is preferable when a connection speed is greater than a predetermined threshold.

* * * * *